(12) United States Patent
Gjovik et al.

(10) Patent No.: US 11,440,252 B2
(45) Date of Patent: Sep. 13, 2022

(54) HIGH SPEED EXTRUSION 3D PRINTER NOZZLE

(71) Applicant: Essentium Inc., Pflugerville, TX (US)

(72) Inventors: Erik John Gjovik, Aliso Viejo, CA (US); William Jack MacNeish, III, Newport Beach, CA (US); Jason Greene, Huntington Beach, CA (US); Iris Gisey Euan Waldestrand, Pflugerville, TX (US)

(73) Assignee: ESSENTIUM, INC., Pflugerville, TX (US)

( * ) Notice: Subject to any disclaimer, the term of this patent is extended or adjusted under 35 U.S.C. 154(b) by 391 days.

(21) Appl. No.: 16/268,873

(22) Filed: Feb. 6, 2019

(65) Prior Publication Data

US 2020/0031046 A1    Jan. 30, 2020

Related U.S. Application Data

(60) Provisional application No. 62/703,700, filed on Jul. 26, 2018.

(51) Int. Cl.
*B29C 67/00* (2017.01)
*B29C 64/209* (2017.01)
(Continued)

(52) U.S. Cl.
CPC .......... *B29C 64/209* (2017.08); *B29C 64/386* (2017.08); *B33Y 30/00* (2014.12); *B33Y 50/00* (2014.12)

(58) Field of Classification Search
CPC ..... B29C 64/209; B29C 64/386; B33Y 10/00; B33Y 30/00; B33Y 50/00; B33Y 50/02
See application file for complete search history.

(56) References Cited

U.S. PATENT DOCUMENTS 2,808,623 A   10/1957 Foster
2,875,311 A    2/1959 Harkenrider
(Continued)

FOREIGN PATENT DOCUMENTS

CN    103350507 A   10/2013
CN    203779867 U    8/2014
(Continued)

OTHER PUBLICATIONS

Deloitte, 3D opportunity for quality assurance and parts qualification—Additive manufacturing clears the bar. Deloitte Nov. 18, 2015 Retrieved on Feb. 17, 2021 from https://www2.deloitte.com/us/en/insights/focus/3d-opportunity/3d-printing-quality-assurance-in-manufacturing.html.

(Continued)

*Primary Examiner* — Ryan M Ochylski
(74) *Attorney, Agent, or Firm* — Vivacqua Crane, PLLC

(57) ABSTRACT

A nozzle is configured for receiving and dispensing a 3D printer filament. The nozzle includes a barrel, a heating element, and an end tip. The barrel has an internal bore and an exterior surface. The internal bore has a filament receiving end and a filament discharge end. A heat break is defined in the exterior surface of the barrel. The heating element is proximate the filament discharge end. The heating element includes a heating wire wrapped around the exterior surface of the barrel. The end tip is proximate the filament discharge end. The 3D filament is received in the filament receiving end heated by the heating element and dispensed through end tip proximate the filament discharge end.

11 Claims, 9 Drawing Sheets

(51) Int. Cl.
*B29C 64/386* (2017.01)
*B33Y 50/00* (2015.01)
*B33Y 30/00* (2015.01)

(56) References Cited

U.S. PATENT DOCUMENTS

| | | | |
|---|---|---|---|
| 3,055,053 | A | 9/1962 | Livingston |
| 6,022,210 | A * | 2/2000 | Gunther ............. B29C 45/2737 264/328.15 |
| 8,236,227 | B2 | 8/2012 | Batchelder et al. |
| 8,512,024 | B2 | 8/2013 | Pax |
| 9,050,753 | B2 | 6/2015 | Rodgers |
| 9,073,263 | B2 | 7/2015 | Swanson |
| 9,321,608 | B2 | 4/2016 | Beery et al. |
| 9,327,452 | B2 | 5/2016 | Mark et al. |
| 9,339,975 | B2 | 5/2016 | Molinari et al. |
| 9,345,070 | B2 | 5/2016 | Long et al. |
| 10,150,249 | B2 | 12/2018 | Ryan et al. |
| 10,343,349 | B2 | 7/2019 | Korn |
| 10,513,103 | B2 | 12/2019 | Leavitt et al. |
| 10,688,588 | B2 | 6/2020 | Twelves |
| 2004/0140292 | A1 | 7/2004 | Kelley et al. |
| 2011/0117517 | A1 | 5/2011 | Bergheim et al. |
| 2012/0018924 | A1 | 1/2012 | Swanson et al. |
| 2013/0209739 | A1 | 8/2013 | Fruth |
| 2014/0287139 | A1 | 3/2014 | Kessler |
| 2015/0183164 | A1 | 7/2015 | Duty et al. |
| 2015/0298393 | A1 | 10/2015 | Suarez |
| 2016/0009030 | A1 | 1/2016 | Mark et al. |
| 2016/0031159 | A1 | 2/2016 | Church et al. |
| 2016/0082641 | A1 | 3/2016 | Bogucki et al. |
| 2016/0151833 | A1 | 6/2016 | Tsao |
| 2016/0297104 | A1 | 10/2016 | Guillemette et al. |
| 2016/0318246 | A1 | 11/2016 | Rios et al. |
| 2016/0339618 | A1 | 11/2016 | Galati |
| 2017/0057168 | A1 | 3/2017 | Miller et al. |
| 2017/0094726 | A1 | 3/2017 | Elserman et al. |
| 2017/0151606 | A1 | 6/2017 | Koga et al. |
| 2017/0190109 | A1 | 7/2017 | Holland et al. |
| 2017/0312849 | A1 | 11/2017 | Yang et al. |
| 2017/0326773 | A1 | 11/2017 | Gibson |
| 2017/0348911 | A1 * | 12/2017 | Bruggeman ............. H05B 6/44 |
| 2017/0361501 | A1 | 12/2017 | van der Zalm et al. |
| 2018/0154586 | A1 | 6/2018 | Wang et al. |
| 2019/0047225 | A1 | 2/2019 | Luo |
| 2019/0099946 | A1 | 4/2019 | MacNeish et al. |
| 2019/0099950 | A1 | 4/2019 | MacNeish et al. |
| 2019/0099952 | A1 * | 4/2019 | MacNeish, III ....... B33Y 10/00 |

FOREIGN PATENT DOCUMENTS

| | | |
|---|---|---|
| CN | 206367193 U | 8/2017 |
| CN | 206425551 U | 8/2017 |
| DE | 102015016455 A1 | 6/2017 |
| EP | 3148293 B1 | 3/2018 |
| FR | 3022826 A1 | 1/2016 |
| KR | 1020080040627 | 5/2008 |
| KR | 20160120538 A | 10/2016 |
| KR | 1020170015952 A | 2/2017 |
| KR | 101796890 B1 | 11/2017 |
| WO | 2016102669 A1 | 6/2016 |
| WO | 2017088754 A1 | 6/2017 |
| WO | 2018026909 A1 | 2/2018 |
| WO | 2018115467 A1 | 6/2018 |
| WO | 2018132157 A2 | 7/2018 |
| WO | 2018194656 A1 | 10/2018 |

OTHER PUBLICATIONS

Quality Magazine, Closed-Loop Control. Quality Magazine Apr. 1, 2016 Retrieved on Feb. 17, 2021 from https://www.qualitymag.com/articles/93217-closed-loop-control.
Stratonics, Temperature Sensors for AdditiveManufacturing-Systems. Stratonics Nov. 2, 2016 Retrieved on Feb. 17, 2021 from https://web.archive.org/web/20161102135225/http://stratonics.com/systems/.
International Search Report and Written Opinion in PCT/US19/43427, International Searching Authority WIPO, dated Oct. 18, 2019.
Glass Nozzles, RepRap <<https://reprap.org/wiki/Glass_Nozzles>> (accessed Oct. 3, 2019).
Buckrap Hot End Bow, Rep Rap <<https://reprap.org/wiki/Buckrap_Hot_End_Bow>> (accessed Oct. 3, 2019).
Hot End Build, JSR's RepRap Mendel <<https://jsrreprap.blogspot.com/2010/07/hot-end-build.html (accessed Oct. 3, 2019).
Electricity Resistant Ceramic Adhesives, Paint, Sojae <<http://sojae.com/AdhesivesE/ER-ceramic.htm>> (accessed Oct. 3, 2019).
Darwin/Thermoplast Extruder, Rep Rap <<https://reprap.org/wiki/Darwin/Thermoplast_Extruder>> (accessed Oct. 3, 2019).
European Patent Office. Extended European Search Report for EP Application 19840371.9, dated Feb. 14, 2022, pp. 1-10.
China National Intellectual Property Administration. First Office Action for CN Application No. 2019800499364 and English translation, dated Feb. 22, 2022, pp. 1-12.
Korean Intellectual Property Office. Notice of Reason for Rejection for KR Application No. 10-2021-7004096 and English translation, dated Sep. 29, 2021, pp. 1-11.

* cited by examiner

HIGH SPEED EXTRUSION 3D PRINTER NOZZLE

CROSS-REFERENCE TO RELATED APPLICATIONS

The present application claims the benefit of the filing date of U.S. Provisional Application No. 62/703,700, filed on Jul. 26, 2018, the teachings of which are incorporated herein by reference.

FIELD

The present disclosure relates generally to 3D printer nozzles and more particularly to nozzles that are configured for high speed extrusion.

BACKGROUND

The statements in this section merely provide background information related to the present disclosure and may or may not constitute prior art.

Traditional 3D printer nozzles are comprised of a barrel, heat block, heater cartridge, temperature sensor and nozzle tip. The barrel is typically threaded into a cooling barrel having cooling fins and a fan that blows air over the fins to keep the cooling barrel from heating up. The barrel has a reduced diameter section of a given length relative to a larger diameter section of the barrel. The larger diameter section of the barrel is threaded into a first bore in the heat block. A second bore disposed in the heat block is configured to accept the heater cartridge. The temperature sensor is secured to an outside surface of the heat block. The nozzle tip is threaded into the first bore in the heat block adjacent the barrel. A 3D filament is received in the barrel, heated and dispensed through the nozzle tip to build a 3D structure.

Thus, while current 3D printer nozzles achieve their intended purpose, there is a need for a new and improved nozzles and methods for receiving and dispensing 3D filament materials to build 3D structures. The new and improved nozzles and methods for receiving and dispensing 3D filament materials should provide a more compact, easily configurable, nozzle structure having enhance temperature controllability.

SUMMARY

According to several aspects, a nozzle for receiving and dispensing a 3D printer filament is provided. The nozzle includes a barrel, a heating element, a heat break, and an end tip. The barrel has an internal bore and an exterior surface. The internal bore has a filament receiving end and a filament discharge end. The heat break is defined in the exterior surface of the barrel. The heating element is proximate the filament discharge end. The heating element includes a heating wire wrapped around the exterior surface of the barrel. The end tip is proximate the filament discharge end. The 3D filament is received in the filament receiving end heated by the heating element and dispensed through a discharge orifice in the end tip.

In another aspect of the present disclosure, a retaining cap is provided for mechanically retaining the end tip to the barrel, wherein the retaining cap has a first open end for receiving the barrel and a second open end for receiving the end tip.

In another aspect of the present disclosure, the barrel includes a first shank and a second shank.

In yet another aspect of the present disclosure, the heating element is positioned on the second shank.

In another aspect of the present disclosure, a temperature sensor attached to the exterior surface of the barrel.

In another aspect of the present disclosure, the barrel has a first diameter portion, a second diameter portion, a third diameter portion and a fourth diameter portion.

In another aspect of the present disclosure, the first diameter portion has a diameter that is greater than a diameter of the second diameter portion.

In another aspect of the present disclosure, the third diameter portion has a diameter that is equal to the diameter of the first diameter portion.

In another aspect of the present disclosure, the fourth diameter portion has a diameter that is less than the diameter of the third diameter portion.

In another aspect of the present disclosure, the barrel is received in an internal bored defined in the retaining cap.

In another aspect of the present disclosure, the heating element includes a bifilar coil.

According to several aspects, a method for receiving and dispensing a 3D printer filament is provided. The method includes receiving the 3D printer filament using a nozzle, heating the 3D printer filament with a heating element, and dispensing the 3D printer filament. The method further includes receiving the 3D printer filament using a nozzle having a barrel and an end tip. The barrel including an internal bore, an exterior surface and a heat break defined in the exterior surface. The internal bore has a filament receiving end and a filament discharge end. Heating the 3D printer filament is accomplished using a heating element proximate the filament discharge end. The heating element includes a heating wire wrapped around the exterior surface of the barrel. The 3D printer filament is dispensed using an end tip proximate the filament discharge end.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present invention provides a nozzle for receiving and dispensing a 3D filament to progressively build a 3D structure. The 3D filament is typically an elongated tubular member made of various polymer or non-polymer materials. The nozzle receives the 3D filament, heats the 3D filament and dispenses 3D filament onto a support platform. The 3D structure is formed by dispensing successive layers of the 3D filament material from the nozzle. A variety of different 3D filament materials may be used to build different 3D structures having different structural properties and appearances.

Figure 1A:
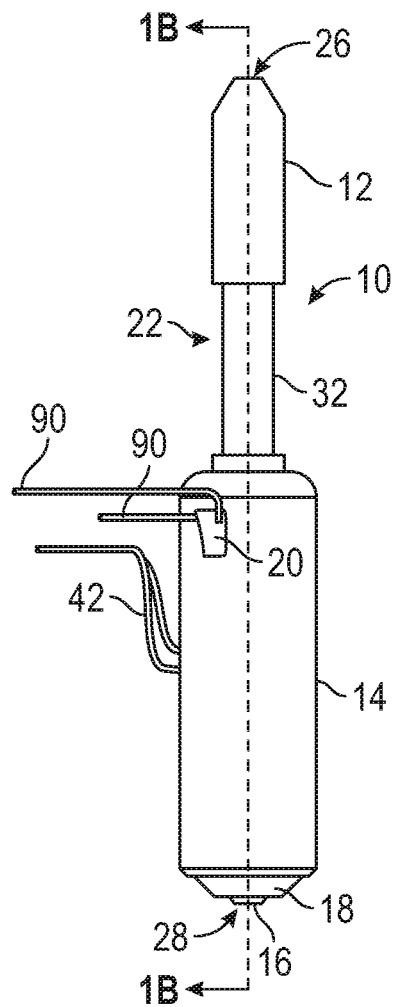
FIG. 1a is a side view of a nozzle for use in a 3D printer for manufacturing a 3D structure, in accordance with one aspect of the invention.

Referring to FIG. 1a, a side view of a nozzle 10 for use in a 3D printer for manufacturing a 3D structure is illustrated, in accordance with one aspect of the invention. Nozzle 10 is configured to receive, heat, and dispense a 3D printer filament. The 3D printer filament is fed into and received by the nozzle under pressure from an external filament feeding apparatus (not shown).

Figure 1B:
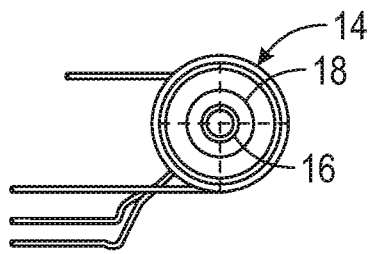
FIG. 1b is an end view of the nozzle of FIG. 1a illustrated in further detail, in accordance with an aspect of the present invention.
Figure 1C:
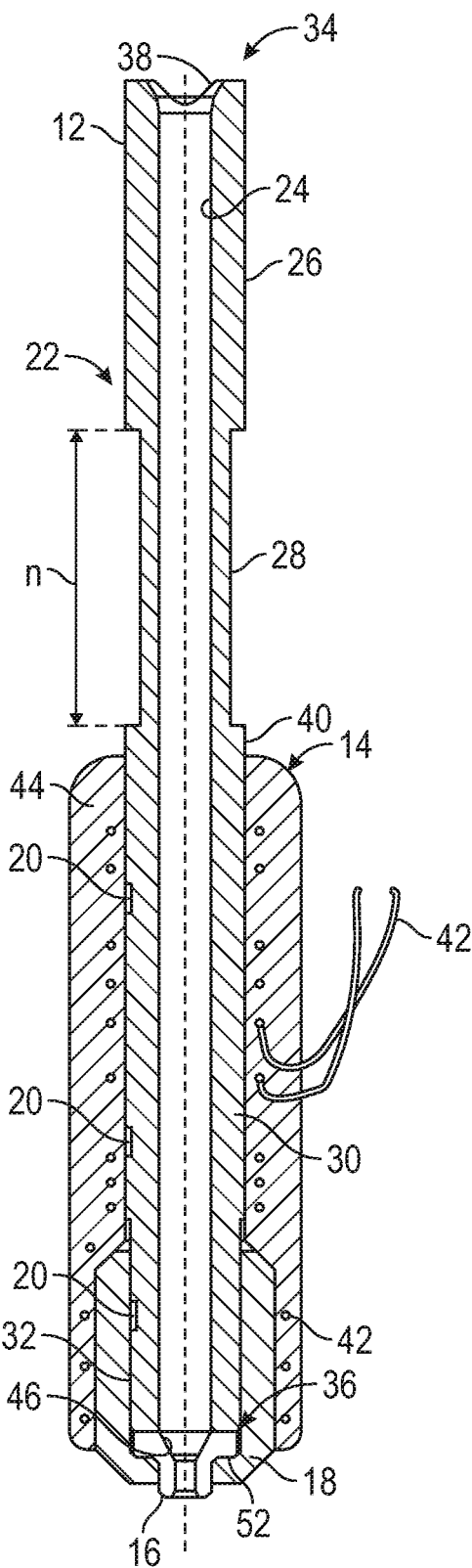
FIG. 1c is a cross-sectional view of the nozzle of FIGS. 1a and 1b illustrated in further detail, in accordance with an aspect of the present invention.

With continuing reference to FIG. 1a and additional reference to FIG. 1b and FIG. 1c, end and cross-sectional views of nozzle 10 are illustrated in further detail, in accordance with an embodiment of the present invention. Nozzle 10 includes a barrel 12, a heating element 14, an end tip 16, a retaining cap 18 and temperature sensor 20.

Barrel 12 has an elongated body 22 having an internal bore 24. The barrel 12 has a first diameter portion 26, a second diameter portion 28, a third diameter portion 30 and a fourth diameter portion 32. The first diameter portion 26 has a diameter that is greater than a diameter of the second diameter portion 28. The third diameter portion 30 has a diameter that is equal to the diameter of the first diameter portion 26. The fourth diameter portion 32 has a diameter that is less than the diameter of the third diameter portion 30. Thus, second diameter portion 28 is a necked down section of elongated body 22 of barrel 12 having a length "n". The length "n" of second diameter portion 28 is configured to allow the necked down section of the elongated body 22 to function as a heat break defined in the exterior surface 40 of the barrel 12. A heat break may be understood as a feature, such as the necked down section of the second diameter portion 28, or a split in the barrel, which reduces the transfer of heat, such as by conduction, along the barrel. Further, cooling of the second diameter portion 28 along the length "n" is facilitated by the addition of cooling fins (not shown) adjacent or overlapping second diameter portion 28.

Internal bore 24 is a through bore running the extent of the elongated body 22 and has a filament receiving end 34 and a filament discharge end 36. The filament receiving end 34 has a chamfered edge 38 for facilitating the receipt of the 3D printer filament. Moreover, barrel 12 has an exterior surface 40 on which the heating element 14 is disposed.

Figure 2:
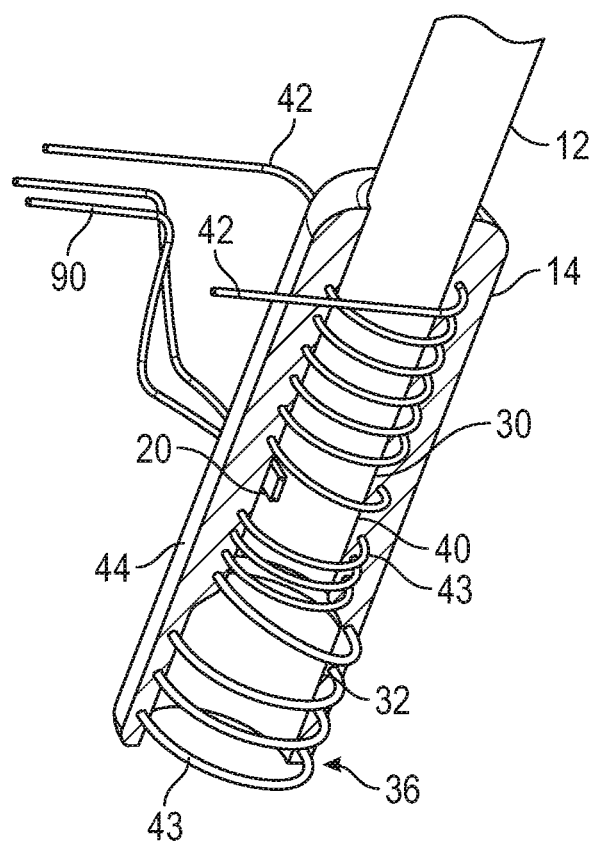
FIG. 2 is a perspective view of the heating element disposed on the barrel of the nozzle, in accordance with an aspect of the present invention.

With continuing reference to FIG. 1c and additional reference to FIG. 2, a perspective view of the heating element 14 disposed on barrel 12 is illustrated in further detail, in accordance with an embodiment of the present invention. The heating element 14 is disposed proximate the filament discharge end 36 over the exterior surface 40 on the third diameter portion 30 and at least overlapping a portion of the fourth diameter portion 32. Heating element 14 includes a continuous heating wire 42 wrapped around the exterior surface 40 of the barrel 12. The heating wire 42 is a nickel-chrome wire or a titanium wire having spaced apart loops 43 around the exterior surface 40 along the third diameter portion 30 and the fourth diameter portion 32 of barrel 12.

An insulating coating or layer 44 of epoxy, fiberglass sheathing, a liquid ceramic, or the like is applied over and, in aspects, under the wrapped heating wire 42. In aspects, where a liquid ceramic is used, the insulation may be a coating, which is part of or on the exterior surface 40 of the barrel 12 and proximal to the coil 42. In aspects, insulating layer 44 could be one layer of epoxy, several layers of epoxy, or a coating on the barrel with liquid ceramic over that. The insulating coating or layer 44 provides a protective electrically insulating covering over the loops 43 of the heating wire 42. Moreover, layer 44 may be several layers applied one after the other and provide heat insulating properties to aid in retaining and controlling the heat produced by heating wire 42 and transferred to the barrel 12.

In aspects, the heating wire 42 may be affixed at various locations or to wire leads leading to a power source or control system (not illustrated) by processes such as microwelding. Micro-welding is understood as a tungsten inert gas (TIG) welding process or a laser welding process—capable of producing welds of less than 5 mm, including all values and ranges therein, such as 1 mm to 5 mm.

Figures 3A, 3B:
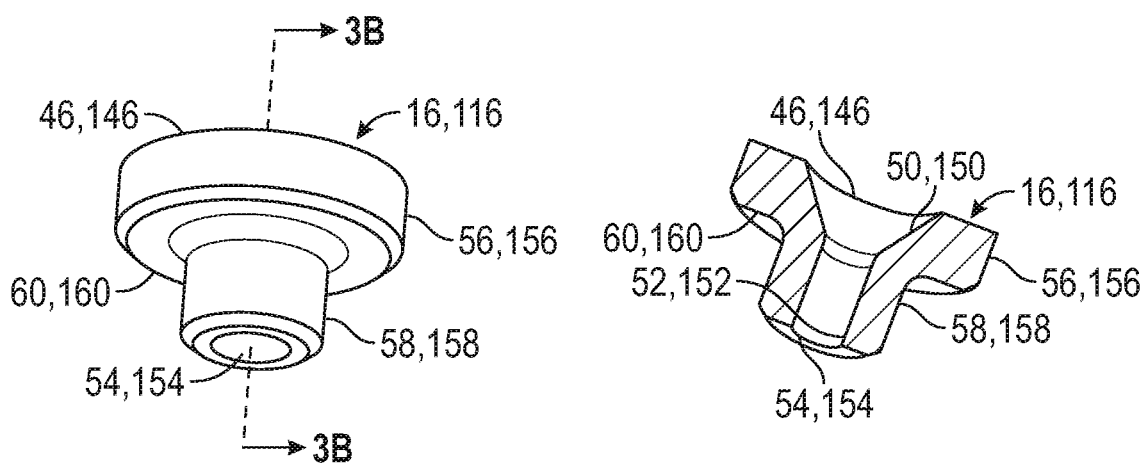
FIG. 3a is a perspective view of the end tip of the nozzle of FIG. 1a, in accordance with an aspect of the present invention.
FIG. 3b is a cross-sectional view of the end tip of the nozzle of FIGS. 1a and 3a, in accordance with an aspect of the present invention.

With continuing reference to FIG. 1c and additional reference to FIGS. 3a and 3b, perspective and cross-sectional views of the end tip 16 are illustrated in further detail, in accordance with an embodiment of the present invention. The end tip 16 is secured to the filament discharge end 36 of barrel 12. The end tip 16 has a filament receiving end 46 adjacent the filament discharge end 36 of the barrel 12. The filament receiving end 46 of the end tip 16 has a frustoconical shaped opening 50 as shown in a cross-section in FIGS. 1b and 3b. The frustoconical shaped opening 50 transitions to a straight bore section 52 that terminates at a discharge orifice 54. Additionally, the end tip 16 has a first diameter section 56 that transitions to a second diameter section 58 forming an annular shelf 60 therebetween. The first diameter section 56 has a larger diameter than the diameter of the second diameter section 58. End tip 16 is made of ruby, sapphire, carbide, ceramic, steel, glass, quartz or the like. An improved extrusion is achieved with end tip 16 through greater adjustability of heat transfer from the heating element 14 to the 3D filament. A variety of end tip 16 configurations are contemplated with different coatings, hardness, internal finish, polish, texture, and entry and exit profiles to control flow of the 3D filament. A particular end tip 16 configuration (i.e. material selection, internal finish, etc.) may be selected for a given 3D filament to ensure filament compatibility, adhesion and wearability of the end tip 16. Thus, the 3D filament is received in the filament receiving end 34, is heated by the heating element 14, and is dispensed through end tip 16 proximate the filament discharge end 36. The ability to select the material properties and finishes, coatings, etc. of the end tip 16 allows the present invention to achieve longer run times without the need to replace the end tip 16.

Figure 4A:
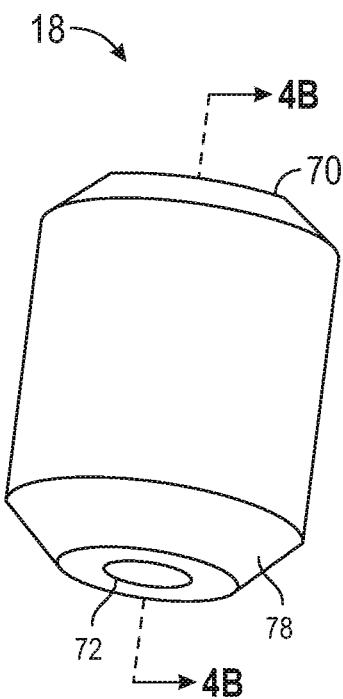
FIG. 4a is a perspective view of the retaining cap of the nozzle of FIG. 1a, in accordance with an aspect of the present invention.
Figure 4B:
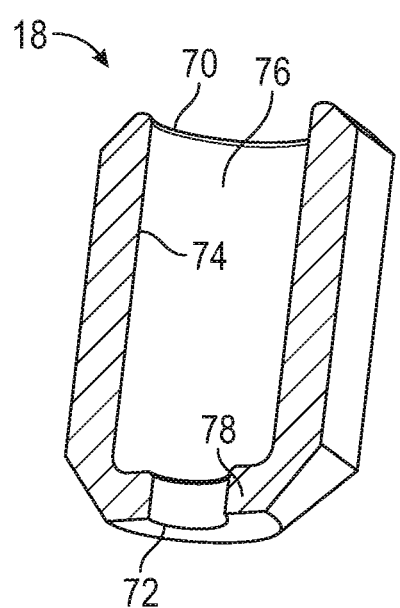
FIG. 4b is a cross-sectional view of the retaining cap of the nozzle of FIGS. 1a and 4a, in accordance with an aspect of the present invention.

With continuing reference to FIG. 1c and additional reference to FIGS. 4a and 4b, perspective and cross-sectional views of the retaining cap 18 are illustrated in further detail, in accordance with an embodiment of the present invention. Retaining cap 18 is configured to mechanically secure the end tip 16 to the barrel 12 and, in aspects the retaining cap 18 may be affixed to the barrel by, e.g., micro-welding. To that end, retaining cap 18 has a first open end 70 for receiving the barrel 12 and a second open end 72 for receiving the end tip 16. An internal bore 74 connects the first open end 70 to the second open end 72 and has an inner diameter of sufficient dimension to accept the insertion of the end tip 16. More specifically, an inner surface 76 of internal bore 74 has a retention means such as an internal thread that engages an external thread on the exterior surface 40 of the barrel 12 to secure the retaining cap 18 on barrel 12. Alternatively, internal bore 74 is sized to create an interference or press fit with the exterior surface 40 of the barrel 12. An annular rim 78 of the second open end 72 of retaining cap 18 engages the shelf 60 of end tip 16, thereby, capturing the end tip 16 in the retaining cap 18. Consequently, the end tip 16 is pressed or sandwiched between the retaining cap 18 and the barrel 12 and the second diameter section 58 of the end tip 16 is received in the second open end 72 of the retaining cap 18. In aspects, the retaining cap 18 is micro-welded to the barrel 12, which may improve performance under pressure and heating cycles.

With continuing reference to FIGS. 1b, 1c, and 2, a perspective view of the temperature sensor 20 disposed on barrel 12 is illustrated in further detail, in accordance with an embodiment of the present invention. The temperature sensor 20 is disposed on the exterior surface 40 of barrel 12 for detecting the temperature of the barrel 12 adjacent the internal bore 24. The present invention contemplates the placement of multiple temperature sensors 20 along the barrel 12, as shown in FIG. 1c. Temperature sensor 20 is attached to the third diameter portion of barrel 12 and in other embodiments of the present invention additional temperature sensors 20 are also attached to the fourth diameter portion of barrel 12. In aspects, the temperature sensor 20 is attached with a polymer adhesive, metal-filled polymer adhesive, metal soldering/brazing material, or similar material, and in further aspects, includes a silver filled epoxy. The positioning of the temperature sensors 20 at various locations along barrel 12 allow for greater control of the temperature profile along barrel 12. For example, temperature sensors 20 are in electrical communication though wire leads 90 with a control system (not shown) that includes control logic to activate the heating wire 42 to heat the barrel 12 and sense the heat in the barrel 12 with the temperature sensors 20 and increase or decrease the heating of the heating wire 42 to achieve the desired temperature profile in the barrel 12. It is noted that the wire leads 90 may be attached at various locations to the temperature sensors 20 or to other wires, which improves durability, performance and safety. Again, attachment may be through micro-welding. It is noted, and further described herein, that one or more of the temperature sensors 20 are, in aspects, applied in channels defined in the exterior surface 40 of the barrel 12. A channel (see 124 in FIG. 6), allows the temperature sensor 20 to sit closer to the interior bore 24, in some cases, less than 0.5 mm from the internal bore 24, including all values and ranges, therein such as 0.1 mm to 0.5 mm, 0.3 mm, 0.2 mm, etc.

Figure 5B:
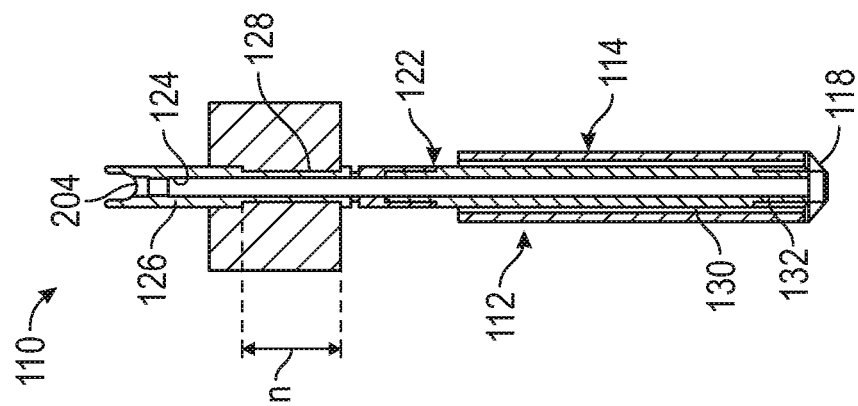
FIG. 5b is a cross-sectional view of a nozzle, in accordance with an aspect of the present invention
Figure 5A:
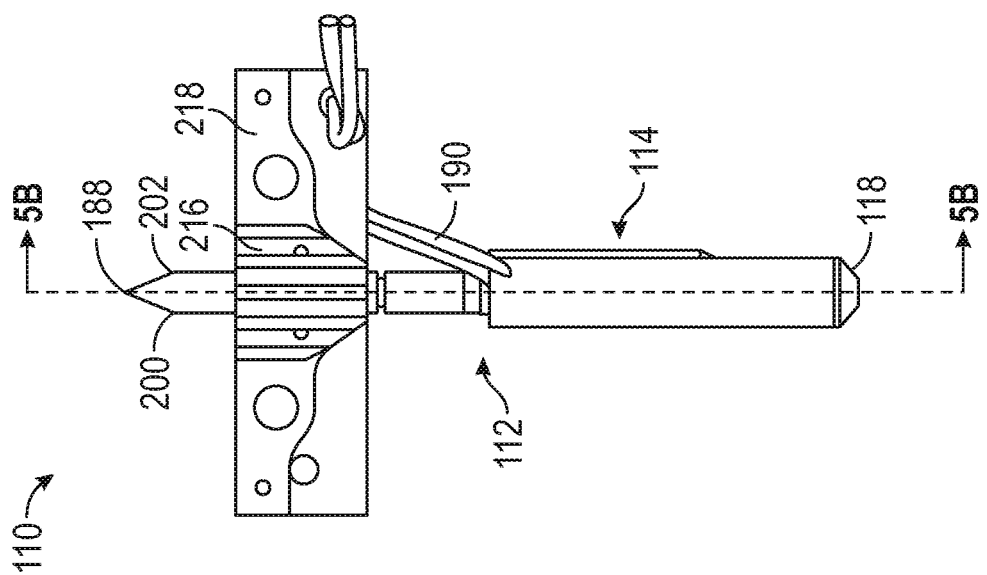
FIG. 5a is a front view of a nozzle, in accordance with an with an aspect of the present invention.

FIGS. 5a and 5b illustrate a front view and a cross-sectional view of a nozzle 110 for use in a 3D printer for manufacturing a 3D structure, in accordance with additional, interchangeable or alternative aspects of the invention. In the illustrated aspect and similar to the nozzle of FIGS. 1a through 1c, the nozzle 110 includes a barrel 112, a heating element 114, an end tip 116, and a temperature sensor 120.

Figure 6:
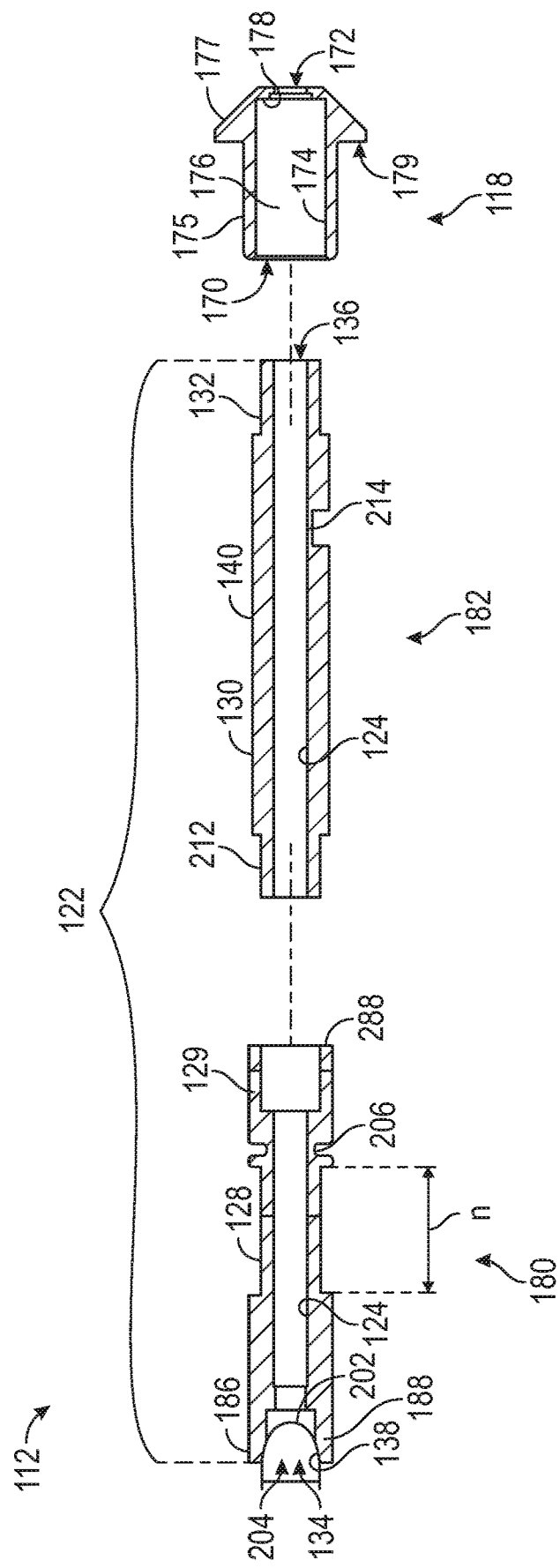
FIG. 6 is an exploded, cross-sectional view of a barrel and an end tip, in accordance with an aspect of the present invention.

With continuing reference to FIGS. 5a and 5b as well as with reference to FIG. 6, which illustrates an exploded cross-sectional view of the barrel 112 and retaining cap 118, the barrel 112 has an elongated body 122 having an internal bore 124. Further, the barrel 112 has a first diameter portion 126, at least one second diameter portion 128, a third diameter portion 130 and a fourth diameter portion 132. The first diameter portion 126 has a diameter that is greater than a diameter of the second diameter portion 128. The third diameter portion 130 has a diameter that is equal to the diameter of the first diameter portion 126. The fourth diameter portion 132 has a diameter that is less than the diameter of the third diameter portion 130. Thus, second diameter portion 128 is a necked down section of elongated body 122 of barrel 112 having a length "n". The length "n" of second diameter portion 128 is configured to allow the necked down section of the elongated body 122 to function as a heat break defined in the exterior surface 140 of the barrel 112. Further, the second diameter portion 128 provides a feature for the clamp 216 and frame 218 to interlock with and prevent vertical movement of the barrel 112 relative to the clamp 216 and frame 218 as further described herein and illustrated in FIGS. 5b, 10 and 11.

In the aspect presented in FIG. 6, the barrel 112 is a multi-component barrel 112 includes a first shank 180 and a second shank 182, which together form the elongated body 122. Each shank 180, 182 defines a portion of the internal bore 124, which runs the extent of the elongated body 122, when the barrel 112 is assembled. In aspects, the first shank 180 is affixed to the second shank 182, such as by micro-welding, which may provide improved performance under pressure and over a number of heating cycles.

The first shank 180 includes the filament receiving end 134. The filament receiving end 134 defines two opposing peaks 186, 188, and two opposing valleys 200, 202, which may assist in guiding the filament into the opening 204 of the filament receiving end 134. The interior of filament receiving end 134 also includes a chamfered edge 138, which also facilitates the receipt of the 3D printer filament; the chamfered edge 138 extending from the opposing peaks 186, 188 to the internal bore 124 beginning beneath the two opposing valleys 200, 202 (further illustrated in FIG. 5a).

In aspects, the first shank 180 is formed out of stainless steel or ceramic and the second shank 182 is formed of aluminum or a separate piece of ceramic. In further aspects, the first shank 180 and second shank 182 are thermally isolated with coatings provided on the first shank 180, the second shank 182, or both the first and second shanks 180, 182. The shanks 180, 182 may alternatively, or additionally, be thermally isolated by an interface material placed between the first and second shanks 180, 182. The thermal isolation may provide another heat break. When the 3D printer is in use and the nozzle 110 is heated, the first shank 180 is at a relatively second temperature than the second shank 182.

In addition, the first shank 180 includes the first diameter portion 126, the second diameter portion 128, and a coupling portion 129. Again the second diameter portion 128 exhibits a smaller diameter than the first diameter portion 126 and the coupling portion 129. In aspects, the first diameter portion 126 and the coupling portion 129 are equal in diameter. Alternatively, the first diameter portion 126 and the coupling portion 129 are of differing diameters. The first shank 180 also includes a notch 206 defined in the coupling portion 129 between the second diameter portion 128 and the end 208 of the first shank 180. The notch 206 has a diameter that is smaller than the second diameter portion 128 and coupling portion 129. Further, in the coupling portion 129, the first shank 180 defines a receiving bore 210, which receives the second shank 182. In aspects, the receiving bore 210 may extend through only a portion of the coupling portion 129, being less than the length of the coupling portion 129. In aspects, the second shank 182 is retained in the receiving bore 210 by an interference or friction fit.

The second shank 182 includes a third diameter portion 130 and the fourth diameter portion 132, wherein the diameter of the fourth diameter portion 132 is less than that of the third diameter portion 130. The second shank 182 also includes a mating portion 212, which is less than the third diameter portion 130 and, in aspects, is the same diameter as the fourth diameter portion 132. The mating portion 212 is received in the receiving bore 210 and, as noted above is mechanically retained therein, such as by an interference fit. The second shank 182 also includes the filament discharge end 136.

Figure 7:
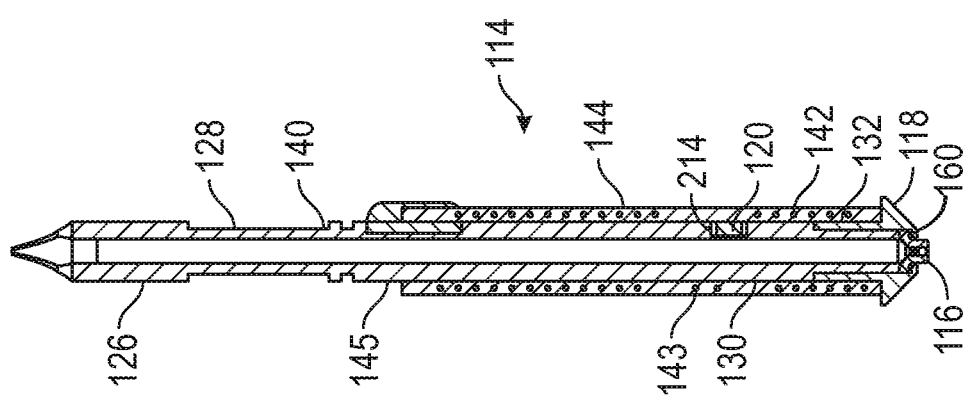
FIG. 7 is a cross-sectional view of a nozzle in accordance with an aspect of the present invention.

In addition, in aspects, the third diameter portion 130 of the second shank 182 includes a channel 214 formed therein in which at least one temperature sensor 120 is positioned (See FIG. 7). It may be appreciated that additional temperature sensors 120 and additional channels 214 may be provided. The channel 214 does not intersect with the internal bore 124. The channel 214 allows the sensor 120 to be placed below the periphery of the remainder of the external surface 140, inside the heater element 114 (including the heater wire 142 and first insulating layer 145) for thermal reasons and places the sensing surface of the sensor relatively closer to the molten polymer in the barrel. In aspects, the channel 214 allows the temperature sensor 120 to sit less than 0.5 mm from the interior surface 124 of the barrel 112, including all values and ranges, therein such as 0.1 mm to 0.5 mm, 0.3 mm, 0.2 mm, etc.

With reference again to FIGS. 5a, 5b, 7 and 8, the barrel 112 has an exterior surface 140 on which the heating element 114 is disposed. In aspects, the heating element 114 is positioned on the second shank 182. In aspects, the heating element 114 is the same as heating element 14 noted above. In the aspect illustrated in FIGS. 7 and 8, the heating element 114 is a heating wire 142 formed into a bifilar coil, wherein the coil contains two parallel windings of loops 143, formed by folding the coil 142 in half creating a loop 141 in the coil, before winding the coil around the barrel 112. The heating wire 142 is formed from the same materials as heating wire 42. With attention now to FIG. 7, a first insulating coating or layer 145 is disposed over the barrel 112 and a second insulating coating or layer 144 is disposed over the heating element 114. The insulating coatings or layers 144, 145 includes, for example, coil fiber glass sheathing, an epoxy layer, an insulating ceramic layer, or the like. In aspects, multiple layers of the epoxy, fiber glass sheathing, ceramic or a combination thereof, are used to provide each of the insulating layers 144, 145.

Figure 9A:
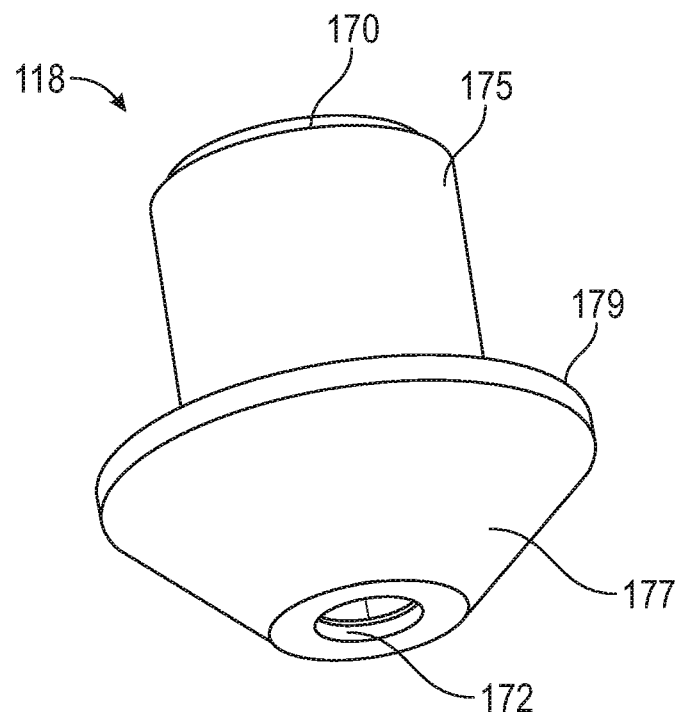
FIG. 9a is a perspective view of a retaining cap in accordance with an aspect of the present invention.
Figure 9B:
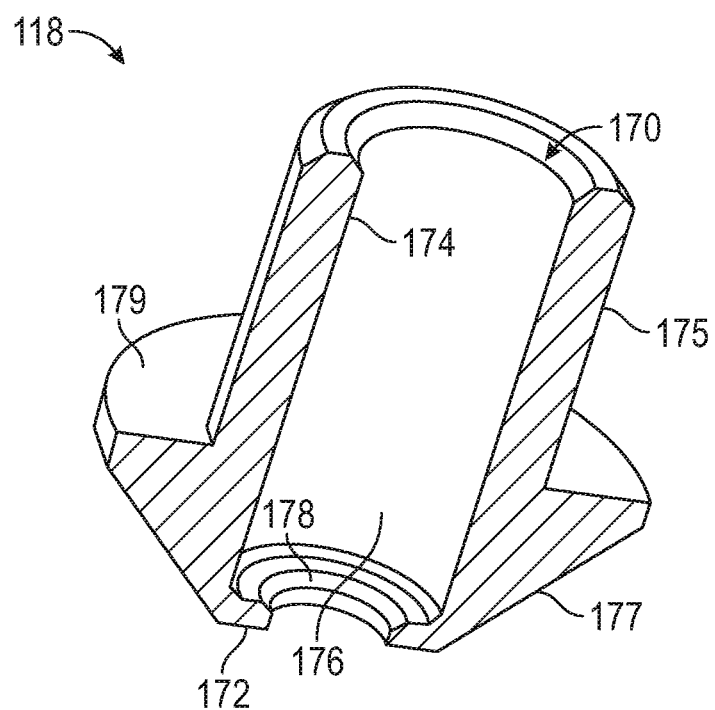
FIG. 9b is a cross-sectional view of the retaining cap of FIG. 9a in accordance with an aspect of the present invention.

With reference to FIGS. 6, 9a and 9b, the end tip 116 is secured to the filament discharge end 136 of the barrel 112 by a retaining cap 118. In addition, the end tip 116 may be affixed to the filament discharge end 136 of the barrel by welding, such as by micro-welding. In the illustrated aspect, the second shank 182 of the barrel 112 is seated in the retaining cap 118 at the filament discharge end 136. The retaining cap 118, in the illustrated aspect, includes a first open end 170 for receiving the barrel 112 and a second open end 172 for receiving the end tip 116. An internal bore 174 connects the first open end 170 to the second open end 172. The internal bore 174 also has an inner diameter of sufficient dimension to accept the insertion of the end tip 116 (seen in FIG. 7). In aspects, an inner surface 176 of the internal bore 174 has a retention means such as an internal thread that engages an external thread on the exterior surface 140 of the barrel 112 to secure the retaining cap 118 to the barrel 112. Alternatively, internal bore 174 is sized to create an interference or press fit with the exterior surface 140 of the barrel 112. An annular rim 178 of the second open end 172 of the retaining cap 18 engages the shelf 160 of end tip 116, thereby capturing the end tip 116 in the retaining cap 118. Consequently, the end tip 116 is pressed or sandwiched between the retaining cap 118 and the barrel 112 and the second diameter section 158 of the end tip 116 is received in the second open end 172 of the retaining cap 118. In aspects, the retaining cap 118 is micro-welded to the barrel 112, which may improve performance under pressure and heating cycles. In the illustrated aspect, the retaining cap 118 has a tubular portion 175 that transitions to a frustoconical section 177. The fourth diameter portion 132 of the second shank 182 is received in and extends through the tubular portion 175 of the retaining cap 118. In aspects, the fourth diameter portion 132 of the second shank 182 may also extend past the tubular portion 175 and into the frustoconical portion 177 of the retaining cap 118, depending on the dimensions of the end tip 116. In addition, in aspects, the heating element 114 may extend over the tubular portion 175 of the retaining cap 118 (as seen in FIG. 5b). The retaining cap 118 may also include an annular shelf 179 located at the transition of the tubular portion 175 and the frustoconical portion 178. In aspects, the heat element 114 rests against the annular shelf 179 as seen in FIG. 7.

The end tip 116, in aspects, is the same as or similar to the end tip illustrated and described with respect to FIGS. 3a and 3b. The end tip 116 is secured to the filament discharge end 136 of barrel 112 and has a filament receiving end 146 adjacent the filament discharge end 136 of the barrel 112. The filament receiving end 146 of the end tip 116 has a frustoconical shaped opening 150 as shown in a cross-section in FIGS. 7 and 3b. The frustoconical shaped opening 150 transitions to a straight bore section 152 that terminates at a discharge orifice 154. Additionally, the end tip 116 has a first diameter section 156 that transitions to a second diameter section 158 forming an annular shelf 160 therebetween. The first diameter section 156 has a larger diameter than the diameter of the second diameter section 158. End tip 116 is made of ruby, sapphire, carbide, ceramic, steel, glass, quartz or the like. An improved extrusion is achieved with the end tip 116 through greater adjustability of heat transfer from the heating element 114 to the 3D filament. A variety of end tip 116 configurations are contemplated with different coatings, hardness, internal finish, polish, texture, and entry and exit profiles to control flow of the 3D filament. A particular end tip 116 configuration (i.e. material selection, internal finish, etc.) may be selected for a given 3D filament to ensure filament compatibility, adhesion and wearability of the end tip 116. Thus, the 3D filament is received in the filament receiving end 134, is heated by the heating element 114, and is dispensed through end tip 116 proximate the filament discharge end 136. The ability to select the material properties and finishes, coatings, etc. of the end tip 116 allows the present invention to achieve longer run times without the need to replace the end tip 116.

Figure 8:
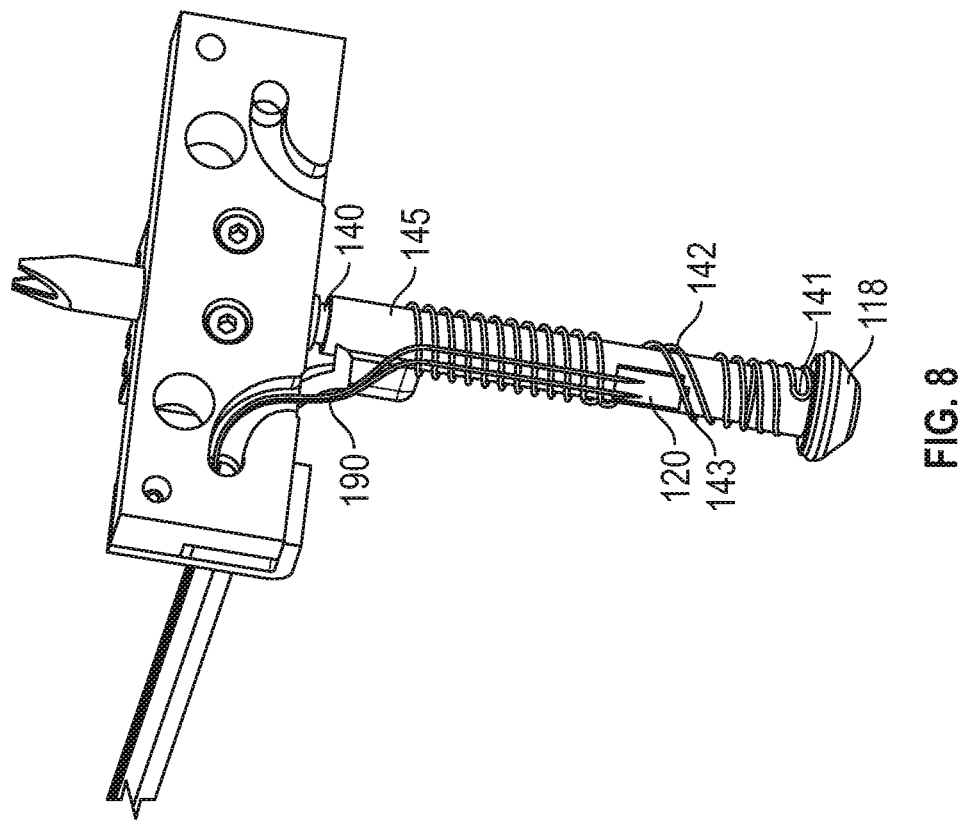
FIG. 8 is a perspective view of a bifilar heating coil wrapped around a barrel in accordance with an aspect of the present invention.

Turning now to FIGS. 7 and 8, and as previously alluded to above, a temperature sensor 120 is disposed on the exterior surface 140 of the barrel 112, and in particular, within the channel 214 defined in the second shank 182 of the barrel 112. Again, more than one temperature sensors 120 may be present and each temperature sensor 120 may be located within its own channel 214. The temperature sensor 120 is similar in nature and function to temperature sensor 20 noted above.

Figure 10:
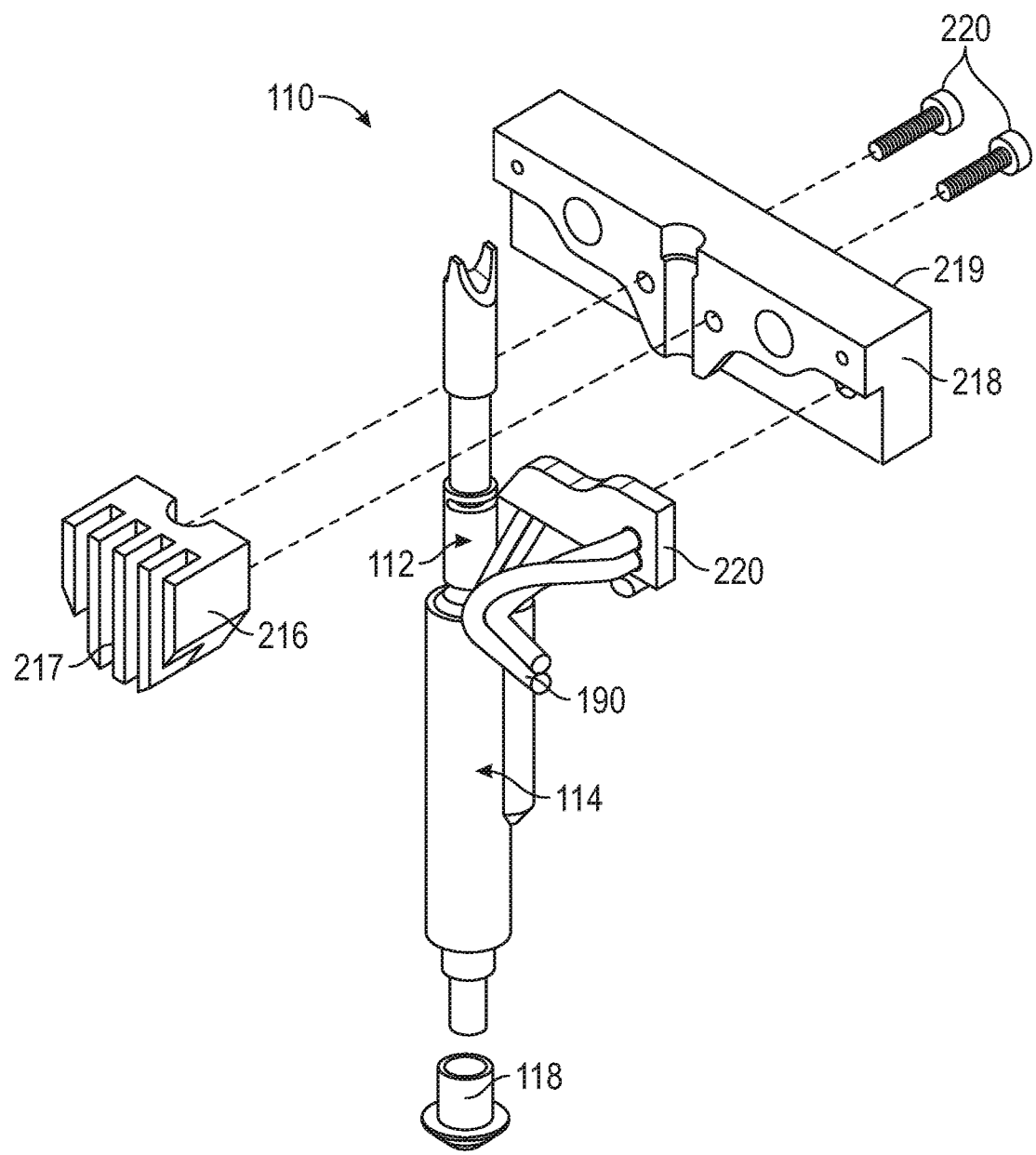
FIG. 10 is an exploded, perspective view of a nozzle in accordance with an aspect of the present invention.
Figure 11:
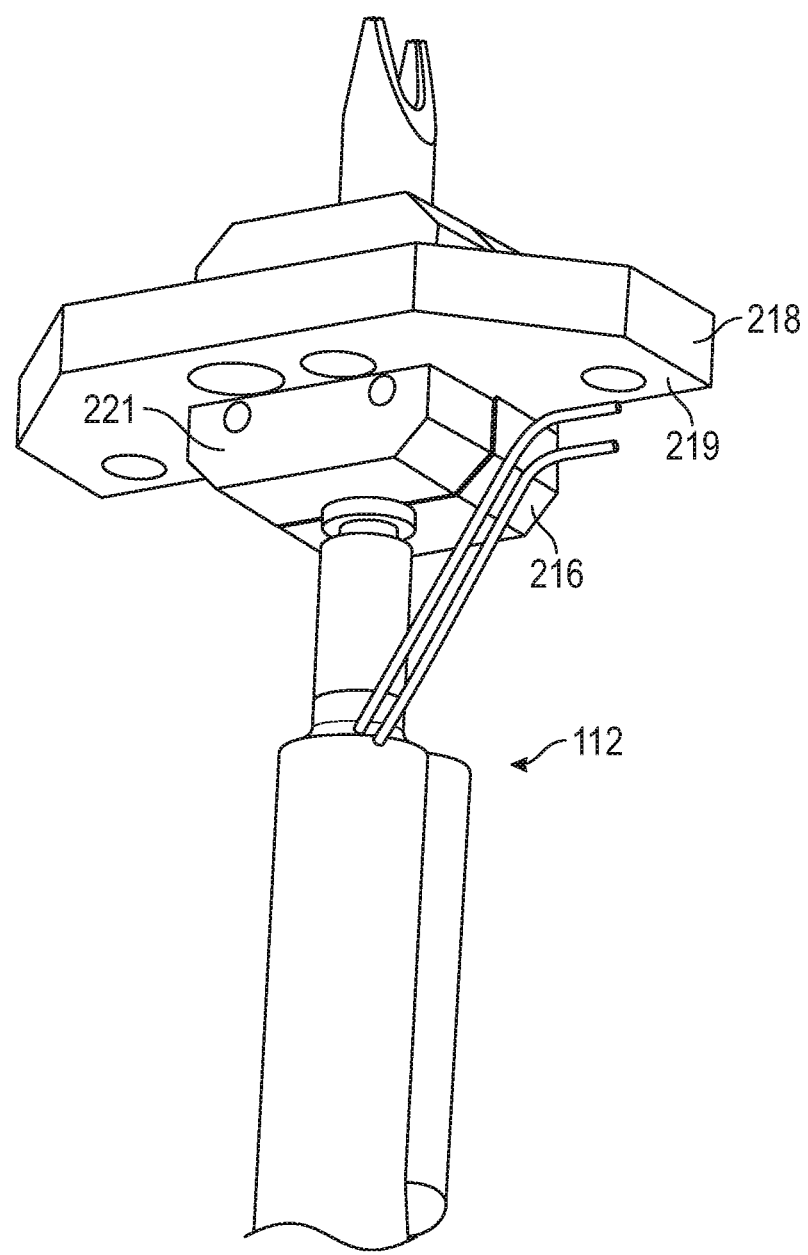
FIG. 11 is a perspective view of a nozzle in accordance with an aspect of the present invention

Turning now to FIG. 10 and with continuing reference to FIGS. 5a and 5b, the nozzle 110 is retained in a frame 218 by a clamp 216, wherein the nozzle 110 is positioned between the frame 218 and the clamp 216. The clamp 216 is mechanically fastened to the frame 218 by mechanical fasteners 220, such as bolts or welds. Further, a connector block 220 is attached to the frame 218 and carries the wire leads 190, which connect the temperature sensor 120 and heating element 114 (see FIG. 5b) to a control system, such as the control system noted above. The wire leads 190 may be affixed to the temperature sensor 120 or at various locations or to other wires, which may improve reliability and durability. Methods of affixing the wire leads 190 include micro-welding. The clamp 216 includes a plurality of fins 217, which provide increased surface area to improve cooling of the clamp 216. The mounting surface 219 of the frame 218 runs parallel to the barrel 112. FIG. 11 illustrates an alternate aspect where the mounting surface 219 of the frame 218 is perpendicular to the barrel 112. In this aspect, the frame 218 may also include a clamp 221 formed with the frame 218 or affixed to the frame 218.

As may be appreciated and understood by a person having ordinary skill in the art, the various features may be interchangeable between the individual aspects described and illustrated herein. In one example, the chamfered edge 138 of FIGS. 5a and b may be substituted for the chamfered edge 38 of FIGS. 1a through 1c. In another example, the unitary barrel construction of FIGS. 1a through 1c, may be substituted for the multi-component barrel construction of FIGS. 5a and 5b.

The present invention further contemplates a method for receiving and dispensing a 3D printer filament. The method includes receiving the 3D printer filament, heating the 3D printer filament, dispensing the 3D printer filament. Moreover, with reference to FIGS. 1a through 11 receiving the 3D printer filament includes using a nozzle 10, 110 having a barrel 12, 112 having an internal bore 24, 124 and an exterior surface 40, 140. The internal bore 24, 124 has a filament receiving end 34, 134 and a filament discharge end 36, 136. Heating the 3D printer filament also includes heating the filament using a heating element 14, 114 proximate the filament discharge end 36, 136. The heating element 14, 114 includes a heating wire 42 wrapped around the exterior surface 40, 140 of the barrel 12, 112. Dispensing the 3D printer filament includes dispensing the 3D printer filament with an end tip 16, 116 proximate the filament discharge end 36, 136.

In aspects, the method further includes mechanically retaining the end tip 16, 116 to the barrel 12, 112 using the retaining cap 18, 118. Mechanically retaining the end tip 16, 116 to the barrel 12, 112 using a cap 18, 118 further includes receiving the barrel 12, 112 with a first open end 70, 170 of the retaining cap 18, 118 and receiving the end tip 16, 116 with a second open end 72, 172 of the retaining cap 18, 118. Furthermore, the end tip 16, 116 mechanically retaining to the barrel 12, 112 by capturing the end tip 16, 116 using an annular rim 78, 178 of the second open end 72, 172 of the retaining cap 18, 118 and pressing the end tip 16, 116 against the barrel 12, 112. The annular rim 78, 178 of the second open end 72, 172 of the retaining cap 18, 118 engages with an annular shelf 60, 160 of the end tip 16, 116.

In aspects, the method includes mechanically retaining a first shank 180 of the barrel 112 to a second shank 182 of the barrel 112. In additional aspects, the method includes retaining the end tip 116 to the second shank 182 of the barrel 112 by micro-welds.

Additionally, the method, includes receiving the 3D printer filament in the nozzle 10, 110 using a barrel 12, 112 having a first diameter portion 26, 126, a second diameter portion 28, 128, a third diameter portion 30, 130, and a fourth diameter portion 32, 132. The barrel 12, 112 has a first diameter portion 26, 126 having a diameter that is greater than a diameter of the second diameter portion 28, 128. In aspects, this forms a heat break in the barrel 12, 112 to inhibit the transfer of heat energy from the third diameter portion 30, 130 to the first diameter portion 26, 126 of the barrel 12, 112. In additional aspects, the barrel 112 is a multi-component barrel 112 that includes a first shank 180 and a second shank 182, wherein heat is applied to the second shank 182 to inhibit the transfer of heat energy from second shank 182 to the first shank 180. The third diameter portion 30, 130 in aspects, has a diameter that is equal to the diameter of the first diameter portion 26, 126. The fourth diameter portion 32, 132 has a diameter that is less than the diameter of the third diameter portion 30, 130 to accommodate the installation of retaining cap 18, 118.

Subsequently, in aspects, the 3D printer filament is dispensed with the end tip 16, 116 having a filament receiving end 46, 146 positioned adjacent the filament discharge end 36, 136 of the barrel 12, 112. The filament receiving end 46, 146 has an opening 50, 150 having a frustoconical cross-section for facilitating the transition of the filament into the end tip 16, 116. The opening 50, 150 connects to a bore 52, 152 adjacent a filament dispensing end 34, 134 of the end tip 16, 116 through a discharge orifice 54, 154 to dispense the 3D filament onto a support platform to construct the 3D structure.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A nozzle for receiving and dispensing a 3D printer filament, the nozzle comprising:
   a barrel having an internal bore and an exterior surface, wherein the internal bore has a filament receiving end and a filament discharge end, and wherein a channel is defined in the exterior surface of the barrel, and wherein the filament receiving end of the barrel defines two opposing peaks and two opposing valleys;

a heat break defined in the exterior surface of the barrel, wherein the heat break reduces the transfer of heat along the barrel;

a heating element proximate the filament discharge end, wherein the heating element includes a heating wire wrapped around the exterior surface of the barrel; and a plurality of temperature sensors attached to the exterior surface of the barrel, wherein the plurality of temperature sensors are positioned within the channel of the barrel; and an end tip proximate the filament discharge end, and wherein the 3D printer filament is received in the filament receiving end is heated by the heating element and dispensed through a discharge orifice in the end tip.

2. The nozzle of claim 1, further comprising a retaining cap for mechanically retaining the end tip to the barrel, wherein the retaining cap has a first open end for receiving the barrel and a second open end for receiving the end tip.

3. The nozzle of claim 1, wherein the barrel includes a first shank and a second shank.

4. The nozzle of claim 3, wherein the heating element is positioned on the second shank.

5. The nozzle of claim 1, wherein the barrel has a first diameter portion, a second diameter portion, a third diameter portion and a fourth diameter portion.

6. The nozzle of claim 5, wherein the first diameter portion has a diameter that is greater than a diameter of the second diameter portion.

7. The nozzle of claim 6, wherein the third diameter portion has a diameter that is equal to the diameter of the first diameter portion.

8. The nozzle of claim 7, wherein the fourth diameter portion has a diameter that is less than the diameter of the third diameter portion.

9. The nozzle of claim 1, wherein the barrel and the end tip are received in an internal bore defined in a retaining cap.

10. The nozzle of claim 1, wherein the heating element includes a bifilar coil.

11. The nozzle of claim 1, wherein the heat break is one of the following: a necked down section of the barrel and a split in the barrel.

* * * * *